(12) United States Patent
Harold-Barry et al.

(10) Patent No.: US 7,940,625 B2
(45) Date of Patent: May 10, 2011

(54) METHOD AND APPARATUS FOR CONTROL OF A WRITE SIGNAL IN AN OPTICAL DISC SYSTEM

(75) Inventors: John A. Harold-Barry, Southhampton (GB); Xinyan Wu, Eastleigh (CN)

(73) Assignee: NXP B.V., Eindhoven (NL)

( * ) Notice: Subject to any disclaimer, the term of this patent is extended or adjusted under 35 U.S.C. 154(b) by 600 days.

(21) Appl. No.: 10/585,907

(22) PCT Filed: Jan. 11, 2005

(86) PCT No.: PCT/IB2005/050124
§ 371 (c)(1),
(2), (4) Date: Jul. 12, 2006

(87) PCT Pub. No.: WO2005/069286
PCT Pub. Date: Jul. 28, 2005

(65) Prior Publication Data
US 2007/0165507 A1    Jul. 19, 2007

(30) Foreign Application Priority Data
Jan. 13, 2004    (GB) .................................. 0400662.3

(51) Int. Cl.
*G11B 20/10*    (2006.01)
(52) U.S. Cl. .................................. 369/59.21; 369/59.11
(58) Field of Classification Search .................. None
See application file for complete search history.

(56) References Cited

U.S. PATENT DOCUMENTS

| | | | | |
|---|---|---|---|---|
| 5,101,394 A * | 3/1992 | Endoh | ........................ | 369/59.19 |
| 5,319,625 A * | 6/1994 | Okuda | ........................ | 369/53.44 |
| 5,365,501 A * | 11/1994 | Fuji et al. | .................... | 369/13.02 |
| 5,742,244 A * | 4/1998 | Swanson et al. | ................. | 341/59 |
| 6,141,671 A * | 10/2000 | Adams et al. | ................ | 708/313 |
| 7,113,468 B2 * | 9/2006 | Udagawa | .................... | 369/59.11 |
| 2003/0048712 A1 | 3/2003 | Bakx | | |
| 2003/0189885 A1 | 10/2003 | Masui et al. | | |
| 2004/0004916 A1 | 1/2004 | Nadershahi | | |

FOREIGN PATENT DOCUMENTS

| | | |
|---|---|---|
| EP | 1 191 523 | 3/2002 |
| JP | 2002358641 | 12/2002 |
| WO | WO 02/097804 | 12/2002 |

* cited by examiner

*Primary Examiner* — Peter Vincent Agustin

(57) ABSTRACT

The present invention provides for an apparatus and method of controlling writing a signal to an optical disc in an optical disk system and including the step of generating a feedback signal to dynamically tune the signal output from a laser source, and including generating a plurality of timing signals serving to define a plurality of sampling windows for selecting data samples from RF signals derived from a signal reflected from the disc, generating a plurality of runlength selection signals to allow for measurement of light reflection at required runlength lands or pits, and measuring light reflected at a runlength land or pit in processing means and employing the measured signal as the said feedback signal for the said tuning of the signal source.

28 Claims, 2 Drawing Sheets

METHOD AND APPARATUS FOR CONTROL OF A WRITE SIGNAL IN AN OPTICAL DISC SYSTEM

BACKGROUND OF THE INVENTION

1. Field of the Invention

The present invention relates to a method and apparatus for the control of a write signal, in particular, for use within an optical disc system.

2. Description of the Related Art

Optical disc technology has developed from initial CD formats to more recent DVD formats requiring ever more accurate and readily controllable optical write devices based upon laser technology.

In order to further enhance the control of the laser source, it has been known to develop feedback signals in order to tune the laser power dynamically during recording onto an optical writable, and/or re-writable disk. Such feedback serves to enhance the quality of the recorded signal irrespective of any local variations in optical characteristics of the surface of the disc arising, for example, from fingerprints, dots and/or scratches on the surface of the disc. Through the use of such feedback signals the write quality can be maintained at a relatively consistent level.

In such known systems, the feedback signal is generally derived and calculated on the basis of measurement of the absorption area of the RF signal for discs comprising dye media, or RF signals sampled between writing pulses for discs comprising phase-change media.

The feedback signal can itself be normalised on the reflection signal when seeking to measure the absorption area, or indeed on the laser power signal as derived from the signal returning from the disc and offering an indication of the reflection measurement.

While such known feedback arrangements have proved advantageous in relation to optical discs employing CD writable and re-writable technology, the analogue basis for the measurements required to arrive at the feedback signal do not support DVD writable and re-writable technologies, and in particular the new Write Strategy employed when writing to DVD media.

SUMMARY OF THE INVENTION

The present invention seeks to provide for a method and apparatus for the control of a write signal for use in an optical disc system and which has advantages over known such methods and apparatus as referred to above.

According to a first aspect of the present invention there is provided a method of controlling writing of a signal to an optical disc and including the step of generating a feedback signal to dynamically tune the source of the said signal, and further comprising the steps of generating a plurality of timing signals serving to define a plurality of sampling windows for selecting data samples from RF signals derived from the signal reflected from the disc, generating a plurality of runlength selection signals to allow for measurement of light reflection at required runlength lands or pits, and measuring light reflected at a runlength land or pit in processing means and employing the measured signal as the said feedback signal for the said tuning of the signal source.

In particular, the width and/or positions of the sampling windows can be programmable and the said RF signals are arranged to be selected when the runlength signal is high.

The sampling rate of the said RF signals advantageously is at least equal to the frequency of a system channel clock and the RF sample signals can be selected by means of the timing signals within a sample engine.

Low pass filtering the sampled signals is preferably introduced and slope and offset values can be calculated on the basis of the low pass sampled signals.

The method of the present invention advantageously employs the feedback signal for fine-tuning the Write Strategy associated with a DVD writable device.

In particular, a threshold value serving to determine which of the sampled signals initiate the said measurement can be adopted.

According to another aspect of the present invention, there is provided a write signal control apparatus arranged for controlling writing of data to an optical disc and comprising means for generating a feedback signal for dynamically tuning the source of the said signal, means for generating a plurality of timing signals serving to define a plurality of sampling windows, means for selecting data samples for RF signals derived from a signal reflected from the disc, means for generating a plurality of runlength selection signals arranged to allow for measurement of the reflection at a runlength land or pit, and processing means for measuring the reflected signal at the runlength land or pit, wherein the said measured signal serves as the said feedback signal for tuning the said signal source.

Means can advantageously be included to provide for the advantageous further features discussed above in relation to the method of the present invention.

BRIEF DESCRIPTION OF THE DRAWINGS

The invention is described further hereinafter, by way of example only, with reference to the accompanying drawings in which.

DETAILED DESCRIPTION

As will be described from the following, the present invention advantageously provides for a digital signal processing method which can offer the same functionality as that of known feedback signal processing methods but which advantageously offers further functionality so as to advantageously dynamically fine-tune the Write Strategy for recording at high speed within DVD writable and re-writable media and also to dynamically fine-tune the laser light source power during recording onto the disc.

The potential for increase in performance when writing a signal to a disc in accordance with DVD writable and re-writable specifications arising from the use of the multi-pulse modulation Write Strategy can rely on such writing and rewriting processes employing Eight to Fourteen Modulation (EFM+) for recording and the present invention can advantageously be arranged to develop the feedback signal based upon the measurement of the temperature of the dye layer of the disc.

Particularly important aspects of an arrangement embodying the present invention are as follows.

A plurality of timing signals are generated and serve to define windows which are employed to select data samples from signals derived from the RF analogue-digital converter within the optical writing device.

The signalling is arranged such that data samples are selected when the timing signals are high and the width of each sampling window, and indeed the positions of the sampling windows, with respect of the actual laser power output signals can be advantageously programmable. Examples of such timing signals are illustrated in FIG. 1.

Figure 1:
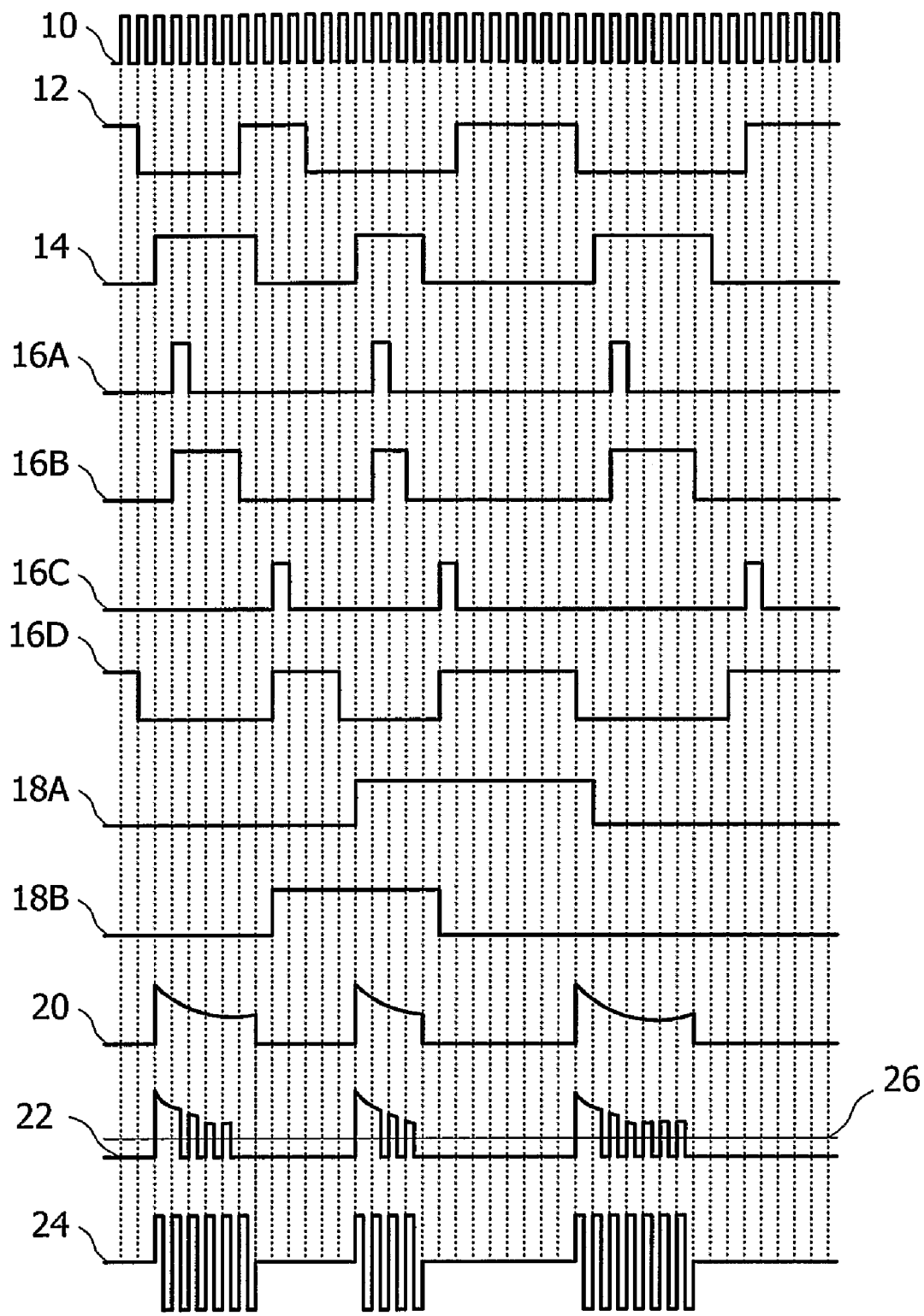
FIG. 1 is a timing diagram illustrating the relationship between writing signals and signals for developing the feedback signal within an embodiment of the present invention.

Referring now to FIG. 1, the waveforms 10, 12 represent the EFM+ channel clock and write signals and waveform 14 illustrates the form of the laser light output signal in accordance with the lands and pits of a disc.

Waveforms 16A-16D represent four of the aforementioned sampling windows and as determined by the aforementioned timing signals.

As mentioned, the sampling windows are programmable and different configurations are illustrated by the different waveforms 16A, 16B, 16C and 16D.

A plurality of runlength selection signals are generated and serve to allow for the measurement of the degree of reflection at a design runlength land or pit. Examples of such runlength selection signals 18A-18B are likewise illustrated in FIG. 1. When a runlength selection signal 18A or 18B is "high", the samples derived from the RF analogue-digital converter are then selected.

As illustrated by the arrows on signals 18A and 18B, the window determined by the runlength selection can comprise either the current and next runlength land or pit, or alternatively the previous and current runlength land or pit.

Since the runlength selection signal can be expressed as (N,>N) this allows for runlengths N, N+1 ..., ... 14 to be selected for a DVD system.

It should be appreciated that the sampling rate of the RF analogue-digital converter within the optical drive can be as low as the frequency of the channel clock illustrated by waveform 10.

The differences between the signals arising for writing to a CD writable dye device 20 and a DVD writable dye device are also illustrated in FIG. 1. As shown the waveform of the signal arising in accordance with the DVD Write Strategy in which the recording mark is divided into a top pulse and a serious of multiple pulses 22 is likewise illustrated.

Yet further, in view of the inherent difference in the Write Strategy employed for DVD writable and re-writable media as compared with that for dye media such as CD writable and re-writable discs, a threshold value 26 as illustrated in relation to pulse waveform 22 can be employed in addition to the window-defining timing signals 16A-16D and the runlength selection signals 18A, 18B in order to select appropriate samples from the radio frequency analogue-digital converter.

For any required absorption measurement, the sampled signals from the RF analogue-digital converter will then only be selected when the magnitude of the samples is greater than the threshold value. Of course, the level of the threshold value can be tuned dynamically within digital signal processing or hardware means at, if required, a lower rate.

The RF PC signals 24 resulting from either of the write signals 20,22 are also illustrated in relation to those write signals within FIG. 1.

As mentioned previously, measurement can be based on dye temperature since the temperature of the dye material alters its frequency response to light. With light of a fixed frequency and known power, a variation in temperature is represented as a variation in reflectivity. This reflectivity could be sampled, for example, by way of waveform 16C to determine how hot the dye is after pit formation. Since the change is relatively small, if can be averaged over a number of samples and compared with samples from waveform 16D where the temperature should have reduced. This information can then be considered for both short and long marks and dye temperature can be determined therefrom. This information can then be used for so-called "thermally balanced write strategy" in which the thermal effect of one mark is taken into account in its neighbours. This is particularly important for high speed writing.

Figure 2:
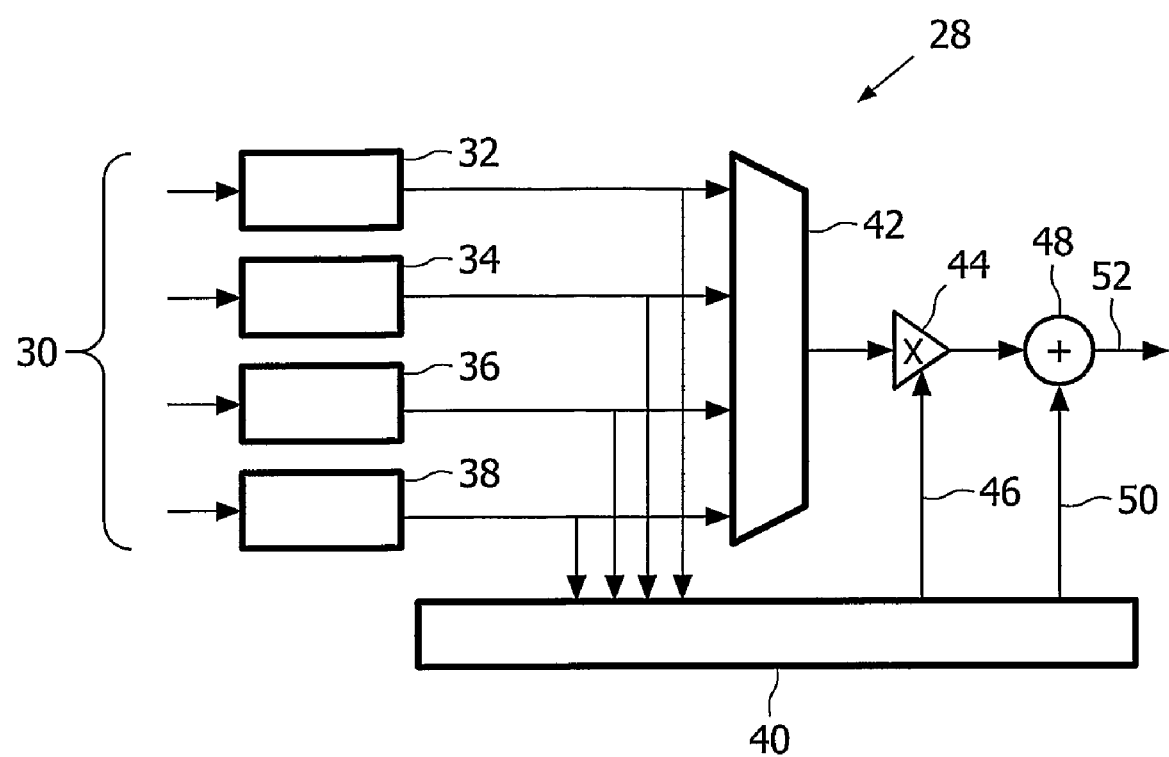
FIG. 2 is a block diagram illustrating one embodiment of signal processing arrangement for producing the feedback signal in accordance with an embodiment of the present invention.

Turning now to FIG. 2, there is illustrated, in block diagram, a signal processing arrangement 28 for use in accordance with an embodiment of the present invention. The input signals 30 to the processing arrangement comprise the RF samples that are effectively selected by the timing signals 16A-16D in a sample engine (not shown).

The portion of the processing arrangement illustrated in FIG. 2 comprises a feedback signal accelerator block which includes low pass filters 32,34,36,38 for receiving each of respective selected binned sampled RF signals from a sample bin engine (not shown).

The low pass signals are then delivered to processor arrangements such as a digital signal processor or digital hardware 40 which serve to calculate slope and offset signals as is described further below.

The low pass signals are also delivered to a selecting unit 42 which is arranged to select one of the low pass signals for delivery to a multiplier 44 arranged to receive the aforementioned slope signal 46, and the resulting signal is output to an adder 48 arranged to receive the aforesaid offset signal 50 from the digital signal processor/digital hardware unit 40. The resulting signal from the adder 48 comprises a feedback signal 52 which, in accordance with the present invention, is employed to provide feedback control to the laser light source of the writing unit so as to seek to achieve consistent write quality irrespective of local variations in the characteristics of the disc and, in particular, in connection with DVD writable and re-writable disc.

The Write Strategy and/or the laser power employed when writing to a DVD disc can therefore advantageously be dynamically fine-tuned.

The invention claimed is:

1. A method of controlling writing of a signal to an optical disc and including the step of generating a feedback signal to dynamically tune a source of said signal, and further comprising:
   generating a plurality of timing signals serving to define a width and/or position of a plurality of sampling windows for selecting data samples from RF signals derived from the signal reflected from the disc,
   generating a plurality of runlength selection signals to allow for measurement of light reflection of the data samples in the sampling windows from RF signals derived from the signal reflected from the disc at required runlength lands or pits, and
   measuring light reflected at a first runlength land or pit in a processing means and employing the measured signal as said feedback signal having a calculated slope and offset to dynamically tune the source of said signal.

2. A method as claimed in claim 1, wherein the width and/or positions of the sampling windows are programmable.

3. A method as claimed in claim 1, wherein said RF signals are selected when the runlength selection signal is high.

4. A method as claimed in claim 1, wherein a runlength sampling window comprises the current plus next runlength land or pit.

5. A method as claimed in claim 1, wherein a runlength sampling window comprises the previous plus current runlength land or pit.

6. A method as claimed in claim 1, wherein the sampling rate of said RF signals is at least equal to the frequency of a system channel clock.

7. A method as claimed in claim 1, wherein the RF sample signals are selected by means of the timing signals within a sample engine.

8. A method as claimed in claim 1, and including the step of low pass filtering the sampled signals.

9. A method as claimed in claim 1, wherein the feedback signal is arranged for fine-tuning the Write Strategy associated with a DVD writable device.

10. A method as claimed in claim 1, further including adopting a threshold value serving to determine which of the sampled signals initiate said measurement.

11. A method as claimed in claim 10, wherein the selected threshold can be tuned.

12. A method as claimed in claim 1, wherein the feedback signal is arranged to fine-tune laser output power of an optical disc writing device.

13. A method of controlling writing of a signal to an optical disc and including the step of generating a feedback signal to dynamically tune a source of said signal, and further comprising:
generating a plurality of timing signals serving to define a plurality of sampling windows for selecting data samples in the sampling windows from RF signals derived from the signal reflected from the disc,
generating a plurality of runlength selection signals to allow for measurement of light reflection of the data samples by selecting data samples in the sampling window from RF signals derived from the signal reflected from the disc at required runlength lands or pits, and
measuring light reflected at a first runlength land or pit in a processing means and employing the measured signal as said feedback signal to dynamically tune the source of said signal, and
low pass filtering the sampled signals, and further including
calculating slope and offset values on the basis of the low pass sampled signals.

14. The method according to claim 13, wherein the slope and offset values are calculated by a digital signal processor.

15. The method according to claim 14, further comprising:
additionally providing the low pass sampled signals to a selecting unit arranged for selecting one of the low pass sampled signals for delivery to a multiplier arranged to receive a slope signal output from the digital signal processor, and
adding an output of the multiplier and an offset signal output from the digital signal processor to provide the resultant feedback signal.

16. A write signal control apparatus arranged for controlling writing of data to an optical disc and comprising means for generating a feedback signal for dynamically tuning the source of said signal, means for generating a plurality of timing signals serving to define a width and/or position of a plurality of sampling windows, means for selecting data samples in the sampling windows for RF signals derived from a signal reflected from the disc, means for generating a plurality of runlength selection signals arranged to allow for measurement of the reflection of the data samples selected at a runlength land or pit, and, processing means for measuring the reflected signal at the run length land or pit, wherein said measured signal serves as said feedback signal having a calculated slope and offset for tuning said signal source.

17. Apparatus as claimed in claim 16, wherein the width and/or positions of the sampling windows are arranged to be programmable.

18. Apparatus as claimed in claim 16, wherein signals from an RF analogue-to-digital converter are arranged for selection when the runlength selection signal is high.

19. Apparatus as claimed in claim 16, wherein a runlength sampling window comprises the current plus next runlength land or pit.

20. Apparatus as claimed in claim 16, wherein a runlength sampling window comprises the previous plus current run length land or pit.

21. Apparatus as claimed in claim 16, wherein the sampling rate of said RF is at least equal to the frequency of a system channel clock.

22. Apparatus as claimed in claim 16, further including a sample engine in which said RF sample signals are selected by means of the timing signals.

23. Apparatus as claimed in claim 16, and including low pass filter means arranged for low-pass filtering the sampled signals.

24. Apparatus as claimed in claim 16, further including means for defining a threshold value serving to determine which of the sampled signals is employed in said measurement.

25. Apparatus as claimed in claim 24, wherein the selected threshold can be tuned.

26. A write signal control apparatus arranged for controlling writing of data to an optical disc and comprising means for generating a feedback signal for dynamically tuning the source of said signal, means for generating a plurality of timing signals serving to define a width and/or position of a plurality of sampling windows, means for selecting data samples in the sampling windows for RF signals derived from a signal reflected from the disc, means for generating a plurality of runlength selection signals arranged to allow for measurement of the reflection of the data samples selected at a runlength land or pit, and, processing means for measuring the reflected signal at the run length land or pit, wherein said measured signal serves as said feedback signal for tuning said signal source;
a low pass filter means arranged for low-pass filtering the sampled signals, and further including means for calculating slope and offset values on the basis of the low pass sampled signals.

27. The apparatus according to claim 26, wherein the means for calculating slope and offset values includes a digital signal processor.

28. The apparatus according to claim 27, wherein the means for calculating slope and offset values further includes a selecting unit arranged for selecting one of the low pass sampled signals,
a multiplier arranged to receive one of the low pass sampled signals output from the selecting unit and to receive a slope signal output from the digital signal processor, and
an adder arranged to receive an output from the multiplier and an offset signal output from the digital signal processor and output the resultant feedback signal.

* * * * *